UNITED STATES PATENT OFFICE.

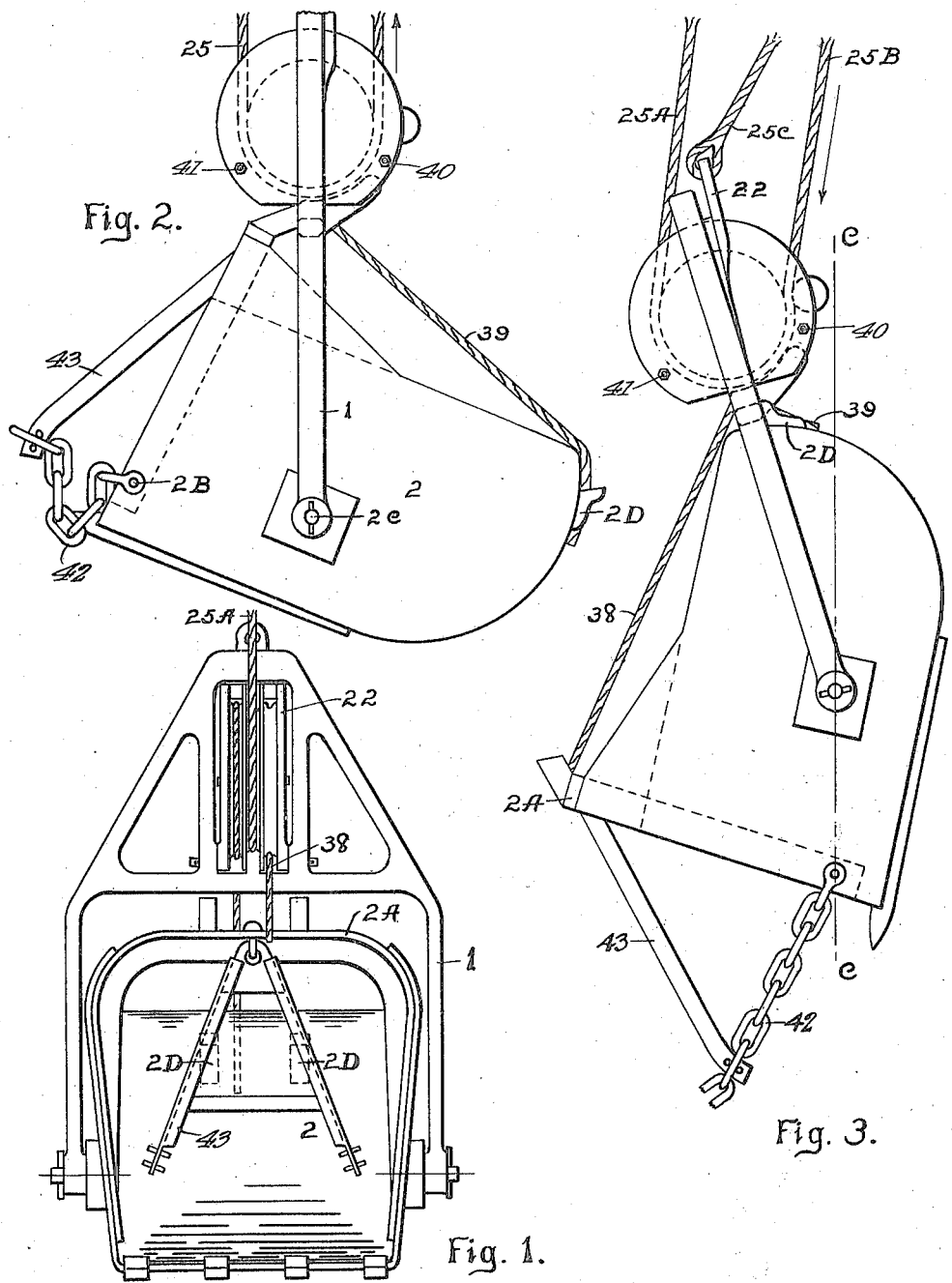

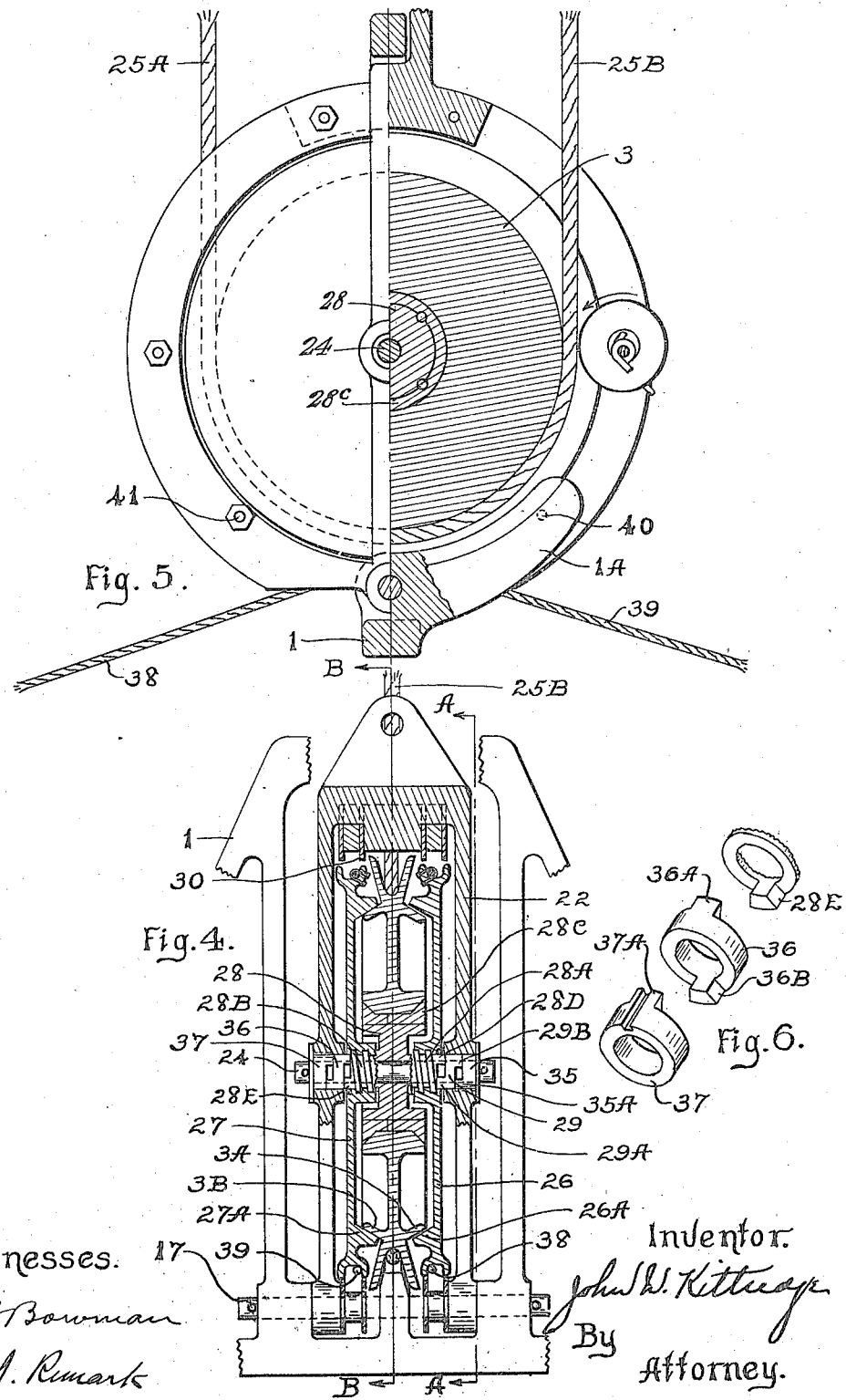

JOHN W. KITTREDGE, OF AKRON, OHIO.

EXCAVATING-BUCKET.

1,264,811.

Specification of Letters Patent.

Patented Apr. 30, 1918.

Application filed May 29, 1916. Serial No. 101,481.

*To all whom it may concern:*

Be it known that I, JOHN W. KITTREDGE, a citizen of the United States, residing in Akron, in the county of Summit and State of Ohio, have invented a new and useful Excavating-Bucket, of which the following is a full, clear, and exact description.

My invention relates particularly to buckets operated by two lines substantially horizontal and vertical and commonly known as "drag line buckets," in which the tension on the respective lines controlled by winding drums, fills, hoists, and discharges the bucket. But many of its features can be applied either directly or with slight modifications, to buckets of other types.

The objects of my improvements are:

1st. To provide a bucket, simple in construction and operation; with mechanism automatic in action and in position protected from injury.

2nd. To enable the operator to pick up the bucket at the point of the boom or beyond, and carry it, hanging low, or hoisted only high enough to clear obstructions, thus economizing power.

3rd. To enable him to discharge the load at the point of the boom or beyond.

4th. To enable him to discharge the load with an impact and jerk, effectually throwing out sticky material.

5th. To provide a hoisting mechanism in which the drag line will not pull against the hoist line, thus further economizing power.

6th. To make the impact of the bucket, as it strikes the ground, force the teeth into the ground, preparatory to digging, and put the bucket and drag line in the digging position.

I attain these objects by the mechanism illustrated in the accompanying drawings, in which—

Figure 1 is a front elevation of the bucket;

Fig. 2 is a side elevation in the carrying position.

Fig. 3 is a side elevation in the dumping position, C—C representing a vertical line.

Fig. 4 is a front elevation of the bail with the operating mechanism in section.

The left half of Fig. 5 is a section of the operating mechanism on line A—A of Fig. 4, and the right half is a section on line B—B of Fig. 4.

Fig. 6 is an isometric view of the flanged sleeves on the central shaft.

A given piece carries the same number throughout the several views, and different edges or faces of a single piece are designated by the number with letters, as $3^A$ $3^B$, etc. For convenience of description, parts fastened rigidly together are cross-hatched alike, even though they may consist of different pieces of metal.

The bucket is made preferably of structural steel with a cast steel jaw or lip.

The drag line is attached at $2^B$, by the intermediate chains 42 and the struts 43. When the bucket falls to the ground, the ends of the struts strike first. The force of the blow is transmitted along the struts and gives the bucket a combined downward and rotary motion, forcing the teeth into the ground and putting the bucket in approximately the digging position. As the drag line tightens, it tends to take the direction of the resistance, or to point to the cutting edge. The pull, therefore, cannot capsize the bucket about the cutting edge, while filling.

The bail 1 is preferably a steel casting and is pivoted to the body 2 slightly in front of its center of gravity. The bucket is carried by a hoist line 25 running in the sheave 3. The sheave 3 is carried through the intermediate piece 28 on the axle 24 in the yoke 22, and the yoke 22 is pivoted in the bail 1 by the shaft 17. The end of the hoist line $25^C$ is fastened to the yoke 22. The rope passes thence up over a sheave in the end of the boom, thence down as shown at $25^A$ around the sheave 3, thence up as at $25^B$ through another sheave in the end of the boom, and thence down the boom to the winding drum. The wheels 26 and 27 run on the same axis as the sheave 3, and grip with the sheave 3 and release from it by gripping and releasing the flanges $3^A$ and $3^B$ as cone clutches. A short piece of wire rope 38 is fastened at one end to the periphery of the wheel 26 and at its other end to the beam $2^A$ on the front of the bucket. Similarly, another rope 39 is fastened at one end to the periphery of the wheel 27 and at its other end to the rear of the bucket.

The piece 28 is preferably of cast iron with screw threads $28^A$ and $28^B$ on its ends, lugs $28^D$ and $28^E$ projecting beyond the threaded portion and bronze rings 28$^C$ on its periphery to resist wear. The piece 28 is carried on the shaft 24. On the shaft 24 and adjacent to the piece 28, are two collars 29 and 36, with the lugs 29$^A$ and 29$^B$, 36$^A$ and 36$^B$, projecting from the ends; and on the shaft adjacent to these collars, are two other collars 35 and 37 with the lugs 35$^A$ and 37$^A$ projecting from the ends thereof. The collars 35 and 37 are keyed to the yoke 22. The sheave 3 is preferably of cast steel and turns on 28$^C$. This design depends on the turning moment of the friction on 3$^A$ and 3$^B$ being greatest; on that on 28$^C$ being next less, and on that on the screws 28$^A$ and 28$^B$ being least of all. This relation is true from the angle of contact of the bearing surfaces and from the respective distances from the center of rotation.
When the bucket begins to hoist, the rope 25$^B$ rises and turns the sheave 3 left handed, as indicated in Fig. 2. The weight of the bucket and load is on the bearings 28$^C$, and with no end thrust, will be carried on the cylindrical or central part of 28$^C$. Between 28$^C$ and the sheave 3, is a considerable friction resulting from this weight and this tends to turn the piece 28 with the sheave 3. Resisting this turning is the friction on the shaft 24, and that on the screw bearings 28$^A$ and 28$^B$. The total pressure on the shaft 24 is the same as on the rings 28$^C$, namely the weight of the load and bucket. The friction on 28$^C$ tends to turn the piece 28 with the revolving sheave 3. The friction on the shaft 24 tends to hold the piece 28 stationary. The friction on 28$^C$ has greater leverage, being farther from the center of rotation, and it therefore prevails and turns the piece 28 with the sheave 3. The cable 38 prevents the wheel 26 from turning, and so the revolving screw 28$^A$ screws into the wheel 26 and brings the flanges 26$^A$ thereof into contact with the flanges 3$^A$ of the sheave 3.
This produces a pressure longitudinally of the shaft 24, and this longitudinal pressure forces the sheave 3 onto the conical part of the ring 28$^C$, making of it a cone clutch and greatly increasing the friction. So the screw 28$^A$ continues to turn in the wheel 26 until the flanges 26$^A$ bind firmly in the flanges 3$^A$. The three pieces, 3, 28, and 26 then turn together, winding the rope 38 onto the wheel 26 and bringing the bucket up into the carrying position, as shown in Fig. 2. At this point the lug 28$^D$ comes in contact with the lug 29$^A$, and the lug 29$^B$ comes in contact with the lug 35$^A$ which is keyed to the yoke 22. This prevents the piece 28 from turning farther. As the sheave 3 turns, the piece 28 now being stationary, it turns on 28$^C$. The wheel 26 continues to turn with the sheave 3 and screws itself away from it, releasing its grip. As the pivot 2$^C$ is normally in front of the center of gravity, the bucket remains in the carrying position, and as it is hoisted to any desired height, the sheave 3 turns idly, making 10 or 100 revolutions as required. If through unusual loading, the center of gravity of the bucket and its load is in front of the pivot 2$^C$, the front of the bucket tends to lower. The sheave 3 then releases the wheel 26 but partially, turning in it with a steady friction, just sufficient to hold the bucket in the carrying position.

While the wheel 26 is winding up the rope 38 during the hoisting operation, the wheel 27 is unwinding the rope 39. When the bucket has come up into the carrying position and the wheel 26 releases from the sheave 3, as just described, it is necessary that the wheel 27 shall also release and allow the sheave to turn idly. This is accomplished by the bolt 40, which extends across the face of the wheel 27. Before the piece 28 is stopped by the collars 29 and 35, the wheel 27 is stopped by the bolt 40, which intercepts the rope 39 near its attachment to the wheel 27 and prevents its further rotation. The piece 28 turning in the wheel 27 then screws the wheel 27 out of contact with the sheave and allows the sheave to run idly.

When the bucket is lowered, the whole operation is reversed. The rope 25$^B$ lowers and turns the sheave 3 right handed, as shown in Fig. 3. This screws the threaded end 28$^B$ into the wheel 27 and brings the flange 27$^A$ into gripping contact with the flange 3$^B$ on the sheave 3. The wheel 27 then winds in the rope 39, and pulls the bucket into the dumping position as shown in Fig. 3. The piece 28 is stopped by the collars 36 and 37 and releases the wheel 27; and the sheave 3 then turns idly as the bucket lowers to the ground. The wheel 26 is stopped by the bolt 41 and screws away from the sheave 3. The bucket may be lowered slowly as when dumping into cars or wagons, in which case the dumping operation is entirely similar but opposite to the corresponding hoisting operation.

However, the rope 25$^B$ may be released, allowing the bucket to drop rapidly under the action of gravity, as when dumping sticky mud on a spoil bank, and then some further parts come into use. The bucket turns rapidly, like a grind stone, about a point near its center of gravity, until the stops 2$^D$ strike the bail 1 with great force. The loaded bucket is many times heavier than the bail, and the force of the blow carries the bail out of the vertical to a position as shown in Fig. 3. The sheave 3 in its yoke 22 does not get the blow and is held back from the bail by its own inertia and by the pull of the rope 25. The piece 1$^A$ is a part of the bail 1, fitting between the flanges of the sheave 3 and conforming to the slopes of their sides. With the bail and the yoke hanging vertically, 1^A is not in contact with the sheave. But when from the blow of the stops 2^D, the bail passes ahead of the yoke as in Fig. 3, 1^A wedges between the flanges of the sheave 3 and stops it. Piece 1^A will bind against the sheave only and will not touch the rope 25. This checks the bucket in its downward course. The bucket thus gets a heavy jar and a jerk so close that they are practically simultaneous, tending to dislodge the sticky mud.

A tightening device may be used as in Fig. 5.

Having thus described my invention, I claim as new and desire to secure by Letters Patent:—

1. An excavating bucket having an open front end, a strut pivotally connected to the upper front portion of the bucket and depending therefrom, and a flexible drag member connecting the lower free portion of the strut to the lower front portion of the bucket, whereby to permit the strut to swing freely within limits toward and away from the lower portion of the bucket in use.

2. An excavating bucket having an open front end, a cutting member along the lower front edge, drag chains attached to the lower front side walls, a bar extending across the upper portion of the open end, a rigid strut pivotally attached to the said bar and hanging lower than the cutting edge when the bucket is in the dumping position, but swinging above the cutting edge when moved in close to the bucket, and a flexible connection between the drag chains and the strut at a point removed from the bucket when the drag chains are in their extended position.

3. An excavating bucket embodying an open ended body portion provided with lateral trunnions, a bail pivotally mounted on said trunnions and having a frame-like extension above said bucket, a yoke pivotally mounted in said frame, a hoist-line connected with said yoke, a shaft in said yoke, a central sheave on said shaft and about which said hoist-line extends, a sheave on each side of said first sheave, a pair of flexible members extending from the front and rear ends of said bucket respectively and each connected with one of said second mentioned sheaves, means for inducing alternate clutching relation between said central sheave and said second mentioned sheaves for alternately winding up said flexible members to control the position of said bucket, the arrangement being such that when the central sheave is rotated by said hoist-line in raising the bucket the flexible member connected with the front end of the bucket is wound on its respective sheave, thereby raising the front end of said bucket, and when the central sheave is rotated in a reverse direction during the lowering operation, the other sheave is actuated to raise the rear end of the bucket.

4. An excavating bucket embodying an open ended body portion provided with lateral trunnions, a bail pivotally mounted on said trunnions and having a frame-like extension above said bucket, a yoke pivotally mounted in said frame, a hoist-line connected with said yoke, a shaft in said yoke, a centrally-positioned sheave on said shaft and about which said hoist-line extends, a lateral flange on each side of said sheave, each flange being in the form of a conic frustum, a sheave on each side of said central sheave and independent thereof, a pair of flexible members extending from the front and rear ends of said bucket respectively, each one to and partially around one of said second sheaves, a lateral flange on each of said second sheaves and each arranged to coöperate with one of the lateral flanges on said central sheave, means for alternately shifting the positions of said second sheaves for alternately winding up said flexible members to control the position of said bucket, the arrangement being such that when said central sheave is rotated by said hoist-line in raising the bucket, the flexible member connected with the front end of said bucket is wound up on its respective sheave, and when the central sheave is rotated in a reverse direction during the lowering operation the other sheave is actuated to raise the rear end of said bucket.

5. An excavating bucket embodying a body portion having lateral trunnions, a bail pivotally mounted on said trunnions, a block pivotally mounted on said bail, a hoist-line connected with said block, a sheave in said block around which said hoist-line extends, independent means having connection with each end of said bucket and with said sheave and arranged to be independently operated, the arrangement being such that when the bucket is raised said means operate to raise the front end of said bucket and when said bucket is lowered said means operate to depress the front end of said bucket for the dumping operation.

6. An excavating bucket embodying an open ended body portion, lateral trunnions from said body slightly in front of the center of gravity thereof, a bail pivotally mounted on said trunnions and having a frame-like extension above said bucket, a block mounted in said frame, a hoist line connected with said block, a shaft in said block, a centrally positioned sheave on said shaft and about which the said hoist line extends, a sheave on each side of said central sheave and independent thereof, a pair of flexible members extending from the front and rear ends of said bucket respectively, each one to and partially around one of said second sheaves, and friction clutches binding the central sheave to one or the other of said second sheaves according as the bucket is raised or lowered.

7. An excavating bucket comprising an open ended body portion with lateral trunnions, a bail pivotally mounted on said trunnions and having a frame-like extension above said bucket, a yoke pivotally mounted in said frame, a hoist line connected with said yoke, a shaft in said yoke, a centrally positioned sheave on said shaft and around which said hoist line extends, a brake shoe adjacent to said sheave, lugs on the rear portion of said bucket body positioned to strike the bail as the bucket turns to the dumping position, and means for simultaneously pressing the brake shoe against the sheave.

In testimony whereof, I have signed my name to this specification, in the presence of two subscribing witnesses this 11th day of May, 1916.

JOHN W. KITTREDGE.

Witnesses:
R. H. BOWMAN,
I. J. REMARK.

Copies of this patent may be obtained for five cents each, by addressing the "Commissioner of Patents, Washington, D. C."